United States Patent [19]
Kato et al.

[11] Patent Number: 5,712,949
[45] Date of Patent: Jan. 27, 1998

[54] DISC REPRODUCTION SYSTEM WITH SEQUENTIAL REPRODUCTION OF AUDIO AND IMAGE DATA

[75] Inventors: Takeshi Kato; Takeshi Miura, both of Kanagawa, Japan

[73] Assignee: Sony Corporation, Japan

[21] Appl. No.: 825,604

[22] Filed: Jan. 24, 1992

[30] Foreign Application Priority Data

| Jan. 29, 1991 | [JP] | Japan | 3-009206 |
| Jan. 29, 1991 | [JP] | Japan | 3-009207 |
| Jan. 30, 1991 | [JP] | Japan | 3-010214 |

[51] Int. Cl.⁶ .................................................. H04N 5/781
[52] U.S. Cl. .................................................. 386/96; 386/106
[58] Field of Search .................................. 358/335, 341, 358/342, 343, 310, 322, 906; 360/33.1; 386/39, 96, 107; 348/512, 515; H04N 5/76, 9/79, 5/781

[56] References Cited

U.S. PATENT DOCUMENTS

| 4,839,746 | 6/1989 | Kanamaru | 358/342 |
| 4,951,155 | 8/1990 | Andrews | 386/106 |
| 4,956,725 | 9/1990 | Kozuki et al. | 358/335 |
| 5,107,343 | 4/1992 | Kawai | 358/341 |
| 5,157,511 | 10/1992 | Kawai et al. | 358/342 |

FOREIGN PATENT DOCUMENTS

| 0292917 | 11/1988 | European Pat. Off. |
| 0 389 261 | 9/1990 | European Pat. Off. |
| 390041 | 10/1990 | European Pat. Off. |
| 0 431 590 A3 | 6/1991 | European Pat. Off. |
| 0 477 815 A1 | 4/1992 | European Pat. Off. |
| 0 479 188 A1 | 4/1992 | European Pat. Off. |
| 0 479 233 A2 | 4/1992 | European Pat. Off. |
| A-2 650 089 | 1/1991 | France |

OTHER PUBLICATIONS

Patent Abstracts of Japan vol. 013 No. 505 (P-959), 14 Nov. 1989 & JP-A-01 204286 (Matsushita Elect Ind Co Ltd) 16 Aug. 1989, *abstract*.

Funkschau, vol. 18, No. 60, Aug. 1988 München, DE, pp. 36–39, XP 000097997 Kaiser P 'Faszination Compact Disc' * the whole document *.

European Patent Search dated Apr. 19, 1995.

*Primary Examiner*—Andrew Faile
*Assistant Examiner*—Vincent F. Boccio
*Attorney, Agent, or Firm*—Limbach & Limbach LLP

[57] ABSTRACT

A disc reproducing apparatus for reproducing a disc on which at least audio data such as sound, music or the like and image data such as pictures, characters or the like are recorded is comprised of a reproducing device for reproducing audio data recorded on the disc, a memory for writing therein image data recorded on the disc, a video signal generating circuit for generating a video signal on the basis of image data stored in the memory, a display supplied with the video signal and displaying thereon the image data, and an image processor for writing the image data on the memory when the audio data is reproduced and selecting the image data written so that selected image data is sequentially displayed on the display.

9 Claims, 14 Drawing Sheets

| FIG.5A | FIG.5B |

DISC REPRODUCTION SYSTEM WITH SEQUENTIAL REPRODUCTION OF AUDIO AND IMAGE DATA

BACKGROUND OF THE INVENTION

1. Field of the Invention

The present invention generally relates to disc and disc player for displaying a picture information and, more particularly, is directed to a disc and disc reproducing apparatus suitably applied to a CD-I (CD-interactive media) disc and a CD-I disc player or the like.

2. Description of the Related Art

CD-I (CD-interactive media) systems have been proposed so far to record video data (natural picture, animation, computer graphics, etc.), text data, program data or the like in addition to audio data on a CD (compact disc) and which can be operated in an interactive fashion. Since the CD-I system has a playback function for playing back characters, video data, audio data, computer data and so on, it can be utilized in AV (audio visual) consumer appliances based on audio visual field, electronic editing based on characters, data base services based on information file, education and amusement based on interactive and answer system or the like. Therefore, the CD-I system is expected as new media.

For the CD-I system, various specifications have been determined so that the system can maintain compatibility with other appliances and that it can be widely utilized at home. More specifically, the CD-I system employs a 68000 system (Motorola) 16-bit microprocessor as a CPU (central processing unit), and CD-RTOS (compact disc real-time operating system) based on the existing OS-9 is employed as a real time operating system for handling a variety of files. Furthermore, two trigger buttons and X-Y pointing devices are employed as an input device and audio and video systems are prepared as an output system. In addition, the CD-I player is designed so as to reproduce, in addition to the CD-I disc, a compact disc (CD-DA) on which normal music data (CD-DA) are recorded. Further, upon playback of this CD-I disc, for example, image data (referred to as a control panel) indicating operation keys such as stop, play/pause, AMS (auto music scan) or the like and other image data are respectively read out from the CD-I disc and displayed on an LCD (liquid crystal display) device provided on the CD-I player.

When using the CD-I disc system, if a CD-DA is reproduced, only image data associated with the operation keys for reproducing audio data are displayed on the LCD display provided as a display unit. When a CD-DA is reproduced image data such as picture, words or the like cannot be sequentially displayed thereon.

OBJECTS AND SUMMARY OF THE INVENTION

Therefore, it is an object of the present invention to provide an improved disc and disc player in which the aforesaid shortcomings and disadvantages encountered with the prior art can be eliminated.

More specifically, it is an object of the present invention to provide a disc and disc player in which images such as pictures, words or the like can be sequentially displayed even when a CD-DA area is reproduced.

Another object of the present invention is to provide a disc and disc player in which, when image data indicative of operation keys such as stop, play/pause, AMS (auto music scan) or the like is displayed on an LCD display, image data such as pictures, words or the like can be displayed without being deteriorated from a visual standpoint.

Still another object of the present invention is to provide a disc and disc reproducing apparatus in which image data to be displayed can be fully displayed and a displayed form of functions of operation keys can be changed.

As a first aspect, the present invention is directed to a disc on which at least audio data such as sound, music or the like and image data such as pictures, characters or the like are recorded. This disc has recorded thereon program data used to read out image data and program data used to select the image data read-out when the audio data is reproduced and which is sequentially displayed on display means provided in a reproducing apparatus. This disc has further recorded thereon operation image data for displaying a control panel having a plurality of operation keys for selecting the audio data or for operating the playback of the audio data on the display means of the reproducing apparatus and program data for displaying the operation image data on the display means together with the image data. The disc of the present invention has further recorded thereon program data for displaying the image data in the form of compressed data when the operation image data is displayed on the display means together with the image data.

As a second aspect, the present invention is directed to a disc reproducing apparatus for reproducing a disc on which at least audio data such as sound, music or the like and image data such as pictures, characters or the like are recorded. This disc reproducing apparatus includes a reproducing means for reproducing audio data recorded on the disc. This disc reproducing apparatus further includes a memory means for writing therein image data recorded on the disc. This disc reproducing apparatus further includes a video signal generating means for generating a video signal on the basis of image data stored in the memory means. This disc reproducing apparatus further includes a display means supplied with the video signal and displaying thereon the image data. This disc reproducing apparatus further includes an image processing means for writing the image data on the memory means when the audio data is reproduced and selecting the image data written so that selected image data is sequentially displayed on the display means. The disc reproducing apparatus of this invention further includes means for writing from the disc operation image data for displaying a control panel having a plurality of operation keys used to select the audio data or to operate the reproduction of the audio data in the memory means. This disc reproducing apparatus further includes means for reading out the written operation data together with the image data and means for displaying the control panel on the display means together with the image data. This disc reproducing apparatus further includes means for displaying the contents of operation functions corresponding to the respective operation keys of the control panel at least in two forms and selecting the forms. This disc reproducing apparatus further includes means for compressing the image data by selecting and throwing away pixels of the image data and means for displaying the compressed image data on a display screen of the display means together with the control panel. This disc reproducing apparatus further includes means for selecting a position at which the control panel is displayed on the display screen of the display means.

In accordance with a third aspect, the present invention is directed to a disc reproducing apparatus for reproducing a disc on which at least audio data such as sound, music or the like and image data such as pictures, characters or the like are recorded. This disc reproducing apparatus comprises a memory means for writing image data recorded on the disc. This disc reproducing apparatus further includes means for compressing the image data stored in the memory means by selecting and throwing away pixels of the image data and writing the compressed image data on the memory means. This disc reproducing apparatus further includes a display means supplied with a video signal generated on the basis of the compressed image data which is capable of displaying the compressed image data. This disc reproducing apparatus further includes means for writing from the disc operation image data for displaying a control panel having a plurality of operation keys used to select the image data or to operate the reproduction of the image data in the memory means, and means for reading out the written operation data together with the compressed image data. This disc reproducing apparatus further includes means for displaying the control panel generated by the operation image data on a display screen of the display means together with the compressed image data. This disc reproducing further includes means for displaying contents of operation functions of respective operation keys of the control panel at least in two forms and selecting these forms. This disc reproducing apparatus further includes means for selecting a position at which the control panel is displayed on the display screen of the display means. Therefore, the image data such as pictures, words or the like are sequentially displayed, the control panel also is displayed and displayed forms of the functions of the operation keys in the control panel can be changed, which can make the disc reproducing apparatus more useful.

BRIEF DESCRIPTION OF THE DRAWINGS

A better understanding of other objects, features, and advantages of the present invention can be gained from a consideration of the following detailed description of an illustrative embodiment thereof, in conjunction with the accompanying drawings in which.

DETAILED DESCRIPTION OF THE PREFERRED EMBODIMENT

An embodiment of the present invention will hereinafter be described with reference to the accompanying drawings. In this embodiment, the present invention is applied to the CD-I player.

Figure 1:
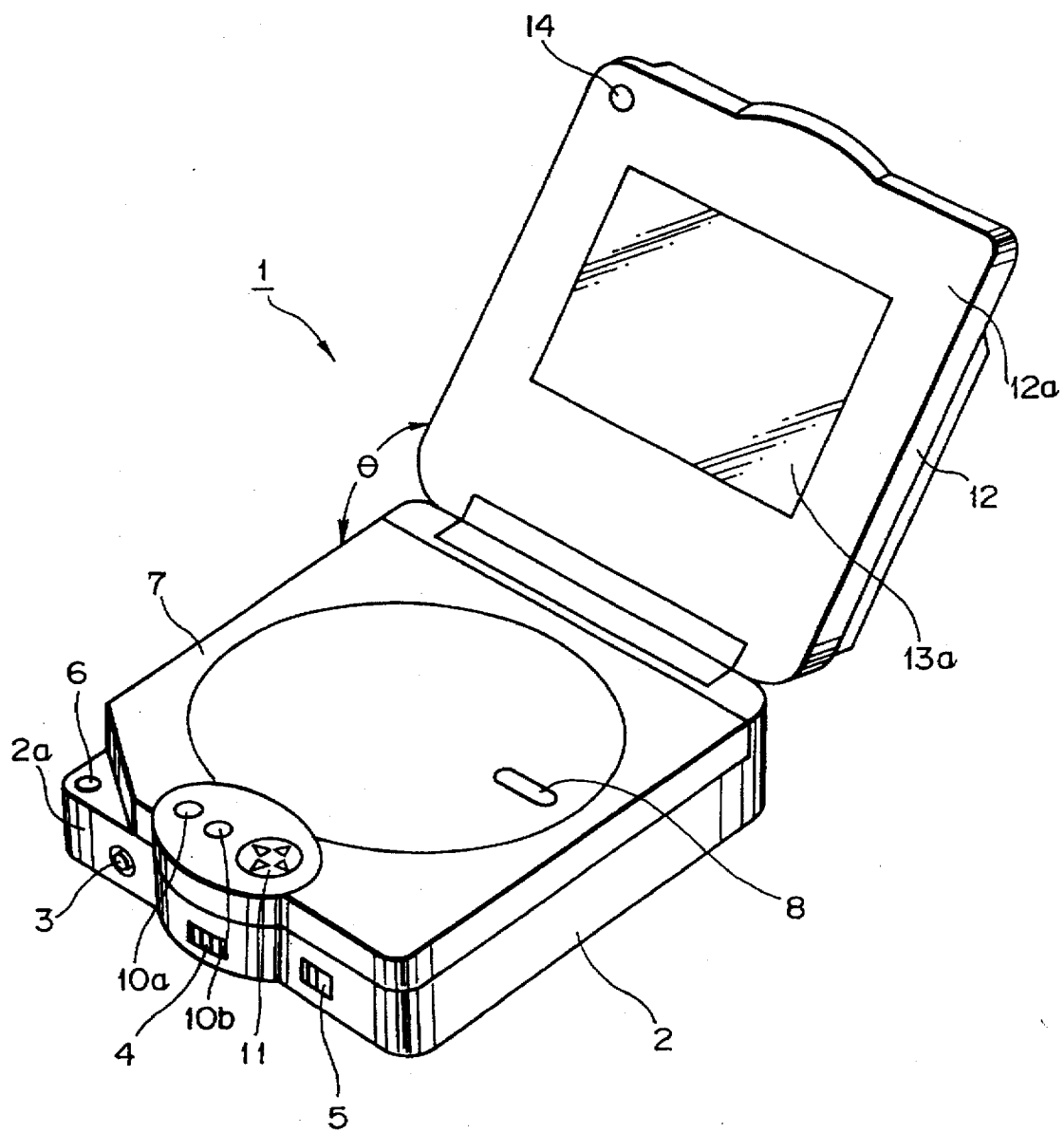
FIG. 1 is a perspective view illustrating an overall arrangement of the disc reproducing apparatus according to an embodiment of the present invention with a middle lid closed.
Figure 2:
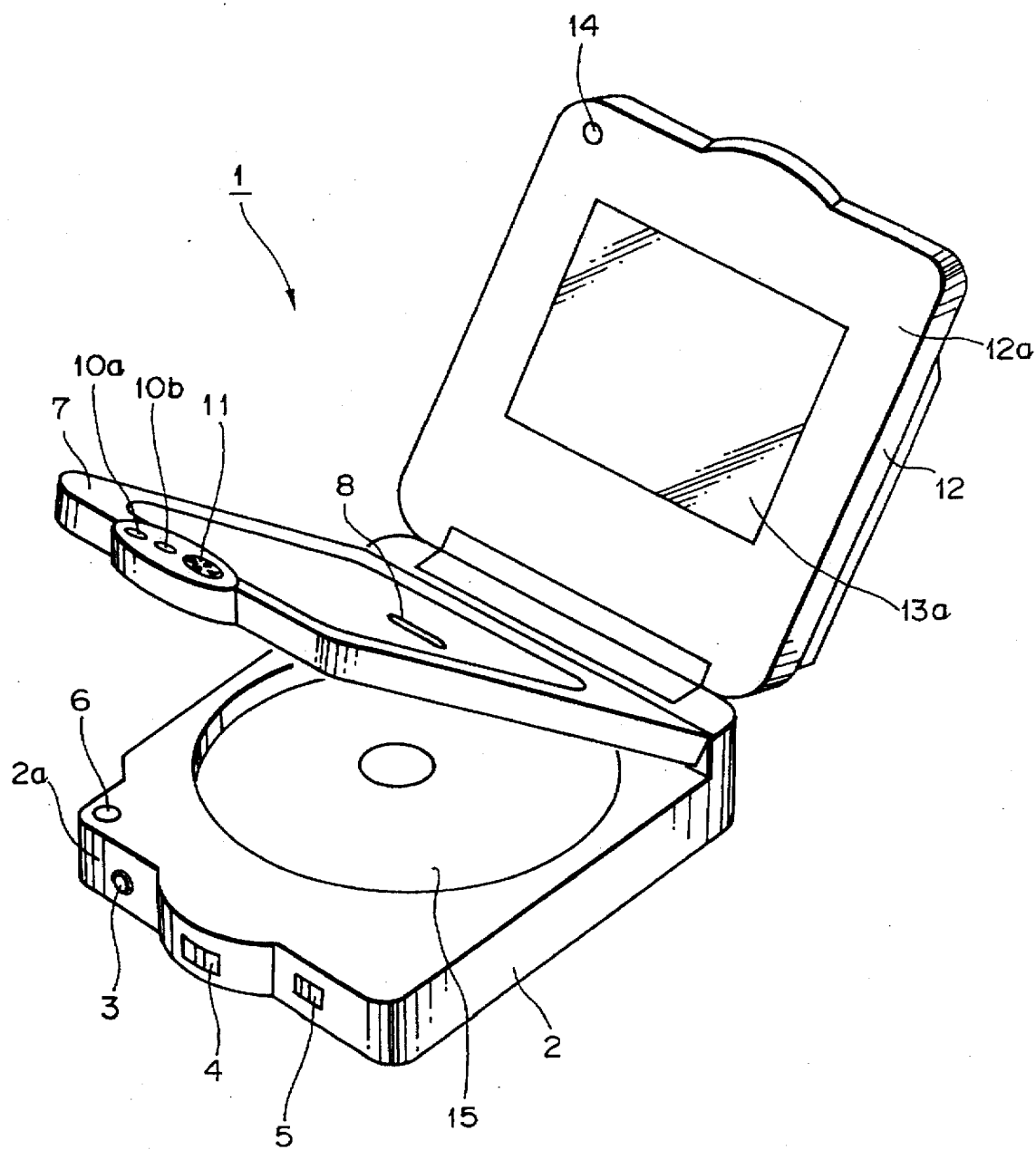
FIG. 2 is a perspective view illustrating an overall arrangement of the disc reproducing apparatus according to the embodiment of the present invention with the middle lid opened.
Figure 3:
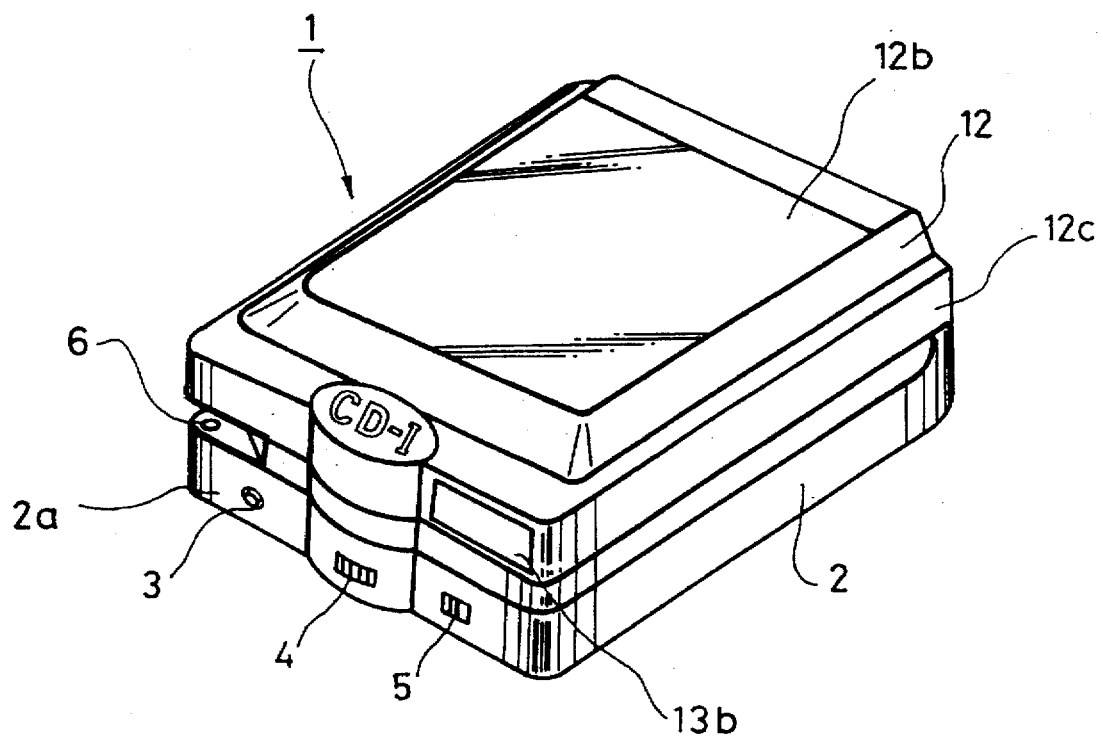
FIG. 3 is a perspective view illustrating an overall arrangement of the disc reproducing apparatus according to the embodiment of the present invention with an outer lid closed.

In FIGS. 1 to 3, reference numeral 1 generally designates the entirety of the CD-I disc player according to the present invention. The CD-I disc player 1 of this embodiment has a liquid crystal display (LCD) 13 unitarily formed therewith so that the user can carry this CD-I disc player 1 outdoors. Further, the CD-I disc player 1 can be miniaturized and reduced in weight by the use of parts fabricated as ICs, semiconductor chips or the like. The overall dimension of the CD-I disc player 1 is 140 mm wide, 170 mm long and 60 mm high, for example.

The CD-I disc player 1 has a player unit 2 the casing of which houses therein an optical disc drive unit for rotating a disc 15 loaded therein, an optical pickup drive unit for moving an optical head along the radial direction of the disc 15 and a printed circuit board on which circuits for processing a reproduced signal from the optical pickup head are mounted. Also, the microcomputer formed of the 68000-type (Motorola) CPU is housed within the casing of the player unit 2.

Further, a headphone jack 3, a volume control dial 4 and a power on-off switch 5 are disposed on a front side wall 2a of the player unit 2, and an open button 6 is disposed on the front upper edge of the front side wall 2a of the player unit 2.

A middle lid 7 is rotatably disposed on the player unit 2 of the CD-I disc player 1. If the above-mentioned open button 6 is depressed, then the middle lid 7 is opened as shown in FIG. 2. If the middle lid 7 is opened, then the disc 15 can be loaded on and unloaded from a disc loading portion of the player unit 2. A window portion 8 is disposed in the middle lid 7 and this window portion 8 is engaged with a transparent member so that the user can visually confirm the rotating state of the disc 15 loaded on the player unit 2 through the window portion 8.

Trigger buttons 10a and 10b and an X-Y pointing device 11 are disposed on the front edge of the middle lid 7. The user can point the position of the optical disc 15 in the X and Y directions by depressing parts shown by triangles in FIGS. 1 and 2 displaced in the upper, lower, left and right directions from the center. The X-Y pointing device 11 can be construed as pointing devices such as a track ball, a mouse, a joystick or the like.

An outer lid 12 is rotatably disposed on the middle lid 7 and this outer lid 12 can be opened in a manual fashion. The outer lid 12 can be openedby 90 degrees or more and can be fixed in a predetermined opening angle θ as shown in FIG. 1. The 4-inch LCD display 13a, for example, is disposed on a rear or inner surface 12a of the outer lid 12. When the outer lid 12 is opened, then the LCD display 13a is exposed as shown in FIG. 1 so that the user can watch the picture screen of the LCD display 13a.

An LCD drive switch 14 is provided on the rear surface 12a of the outer lid 12 and the LCD display 13 can be turned on and off by operating the LCD drive switch 14.

Further, as shown in FIG. 3, an LCD display 13b for CD-DA is provided on the front wall of the outer lid 12. When the LCD display 13a is not needed, or when the CD-DA disc is played back, by closing the outer lid 12 toward the front, the disc CD-I disc player can be utilized similarly to the portable compact disc reproducing apparatus which are now widely available on the market. Incidentally, the CD-DA LCD display 13b might be provided on a front surface 12b or on a side surface 12c of the outer lid 12 and can display thereon the number of music programs, music number or music name of the music now played back upon reproduction of the CD-DA. This information may be displayed on both of or either of the LCD displays 13a and 13b.

The CD-I disc player 1 of this embodiment can reproduce a CD-I disc, a CD-I/CD-DA disc (disc in which CD-I tracks and CD-DA tracks are formed in a mixed state) and CD-DA disc (standard compact disc for playing back musical program) as the optical disc 15. The data format of the CD-I disc will be described below.

According to the CD-I disc, data can be recorded on the in the format based on the CD-ROM (CD-read only memory) and the recorded unit of data is a block similar to that of CD-ROM. One block corresponds to 98 frames and the capacity of one block is expressed as:

6 (audio data number) × 2 (stereophonic 2 channels) ×

2 (byte unit conversion) × 98 (frame number) = 2352 bytes

The entire recording capacity of the CD-I disc becomes about 640 Megabytes when the CD-I disc is 12 cm in diameter.

Two kinds of form (form 1 and form 2) are available as data structures of the CD-I and the forms 1 and 2 correspond to mode 1 and mode 2 of the CD-ROM, respectively.

According to the mode 1 in the CD-ROM, an error detecting code and an error correcting code are added to data of one block so that the powerful error correction becomes possible, while according to the mode 2 in the CD-ROM, the error detecting code and the error correcting code are not added to data, thereby to provide a large amount of user data In the CD-I, the form 1 and the form 2 can be designated at every block and also the form 1 and the form 2 can be recorded on one optical disc in a mixed state.

The CD-I format is different from the CD-ROM format in that a sub-header of 8 bytes is provided at the starting portion of the user data. Of this sub-header, respective blocks on which sound, picture and data are recorded are time-division-multiplexed at the block unit. Then, in order to process these data in a real time fashion, necessary data are written doubly and accommodated. The sub-header is composed of four items of file number, channel number, sub mode and data type.

Figures 4A, 4B, 4C:
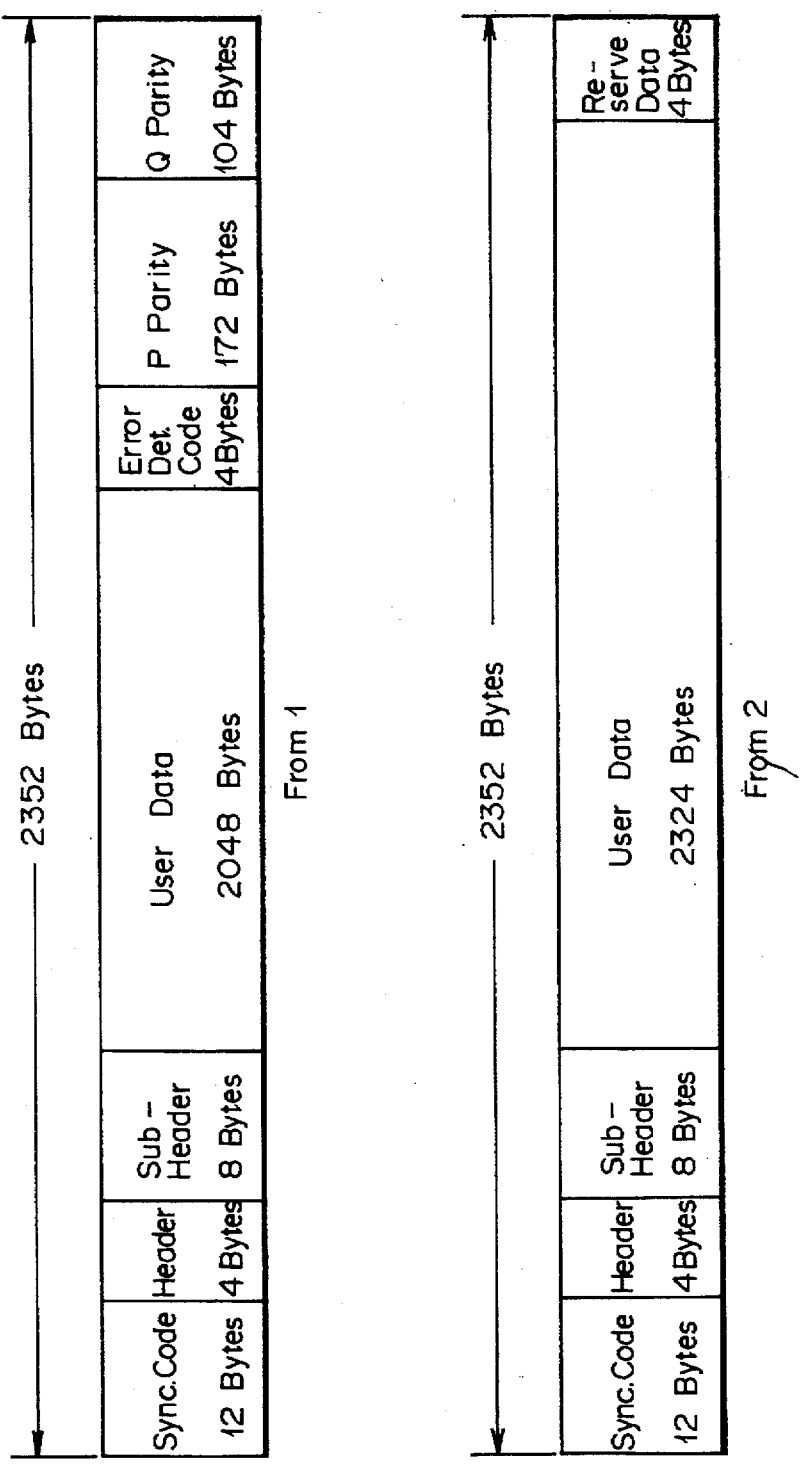
FIGS. 4A and 4B are schematic diagrams diagrams showing formats (i.e., form 1 and form 2) of CD-I sector according to the embodiment of the present invention.
FIG. 4C is a schematic diagram showing an arrangement of a sub header according to the embodiment of the present invention.

FIG. 4A shows a data structure of form 1. In the data structure of form 1, a synchronizing (sync.) code (12 bytes) is provided at the head thereof which is followed by a header (4 bytes) and the sub-header (8 bytes), in that order. The sub-header (8 bytes) is followed by user data (2048 bytes) to which there are added an error detection code EDC (4 bytes), P parity (172 bytes) and Q parity (104 bytes) for error correction. The form 1 is high in error correction capability and is therefore suitable for the case such that data such as character data, program data or the like in which error interpolation is impossible are processed.

FIG. 4B shows a data structure of form 2. According to the form 2, a sync. code (12 bytes) is provided at the head thereof and the sync. code is followed by a header (4 bytes) and a sub-header (8 bytes), in that order. The sub-header is followed by user data (2324 bytes) and a reserve area (4 bytes). This form 2 is suitable for processing data such as audio data, video data or the like in which error can be interpolated.

The sub-header added to the starting portion of the user data is composed of the file number (2 bytes), the channel number (2 bytes), the sub mode (2 bytes) and the data type (2 bytes) as shown in FIG. 4C.

Audio data is written in the CD-I disc in the following four modes:

According to a first mode, the audio data is written under the condition such that a sampling frequency is 44.1 kHz and a quantization bit number is 16 bits, which is the same as the recording system of the existing CD-DA. The first mode is intended to perform ultra-high fidelity playback.

A second mode employs an ADPCM (adaptive differential PCM (pulse code modulation) as a recording system. In this mode, the sampling frequency is 37.8 kHz and the quantization bit number is 8 bits. The second mode can reproduce sound of quality substantially equal to that of the LP (long play) record. The playback time is 2 hours in the stereophonic mode and 4 hours in the monaural mode. This second mode is intended to perform high fidelity playback.

A third mode employs the ADPCM as a recording system, in which the sampling frequency is 37.8 kHz and the quantization bit number is 4 bits. According to the third mode, sound of quality substantially equal to that of FM broadcasting can be reproduced. A playback time of the third mode is 4 hours in the stereophonic mode and 8 hours in the monaural mode. The third mode is intended to perform high fidelity playback for a long period of time.

A fourth mode employs the ADPCM as a recording system, in which the sampling frequency is 18.9 kHz and the quantization bit number is 4 bits. A playback time is 8 hours in the stereophonic mode and 16 hours in the monaural mode. The fourth mode is intended to play back speech.

Video data will be described next and the video data is processed in accordance with the types thereof as follows:

In the case of the natural picture, a sampling frequency of a luminance signal Y is selected to be 7.6 MHz, a sampling frequency of color difference signals U, V is selected to be 3.8 MHz and these luminance signal Y and color difference signals U, V are sampled at the ratio of 4:2:2. Then, respective 8 bits are compressed and then recorded as 4 bits, while they are expanded to 8 bits upon playback.

In the case of the graphics data, a CLUT (color lookup table) is employed, and three modes of 256 colors (8 bits), 128 colors (7 bits) and 16 colors (4 bits) are available as CLUT graphics data. Therefore, in use, the user can select necessary colors from about 16800000 colors and use the same.

In the case of animation, a run length code is employed. The run length code is used to compress image data by utilizing color data and the length between pixels. The animation can be realized on the full screen by using such run length code.

An example of the disc according to this invention will be described. In the CD-I disc, mechanical dimensions such as dimension of outer diameter, dimension of central aperture, thickness or the like, optical parameters such as refractive index, reflectivity or the like, recording parameters such as disc rotation direction, recording linear velocity, shape of track, track pitch or the like, circumstance and situation in use are selected to be exactly the same as those of the ordinary compact disc (CD-DA) for music.

It is determined by the content of a TOC (table of contents) on the read-in area of the optical disc whether or not the optical disc is the CD-I disc. That is, in the CD-I disc or in the CD-I/CD-DA disc, PSEC is "10" when POINT=A0, while in other discs, PSEC is "00" when POINT=A0. Accordingly, from the PSEC provided when POINT=A0, the type of the optical disc, i.e., whether the optical disc is the CD-I disc, the CD-I/CD-DA disc or other disc can be determined. Further, a control field of the CD-I disc when POINT=A0, A1, A2 is (01X0), while the control field of the CD-I/CD-DA disc when POINT=A0 is constantly (01X0) and the control field of other disc is (00X0). Accordingly, it can be determined by the control field whether the optical disc is the CD-I disc or the CD-I/CD-DA.

The CD-I includes audio data and high speed processing must be executed in a real time fashion so the processing is executed by means of machine language. As a CPU for such high speed processing, a 68000-type (Motorola) of a 16-bit CPU is designated. Further, a CD-RTOS (real time operating system) which handles a variety of files is based on the OS9 and the program therefor is stored in a ROM (read only memory), which is fabricated into the system. At least two trigger buttons and the X-Y pointing device are provided as the input device and two outputs are provided for audio and video systems. Furthermore, the CD-I disc player is designed so as to reproduce the CD-DA disc for music entertainment.

The inside arrangement of the disc reproducing apparatus according to the present invention will be described below with reference to FIG. 5. In this case, FIG. 5 is formed of FIGS. 5A and 5B drawn on two sheets of drawings so as to permit the use of a suitably large scale.

Figures 5, 5A:
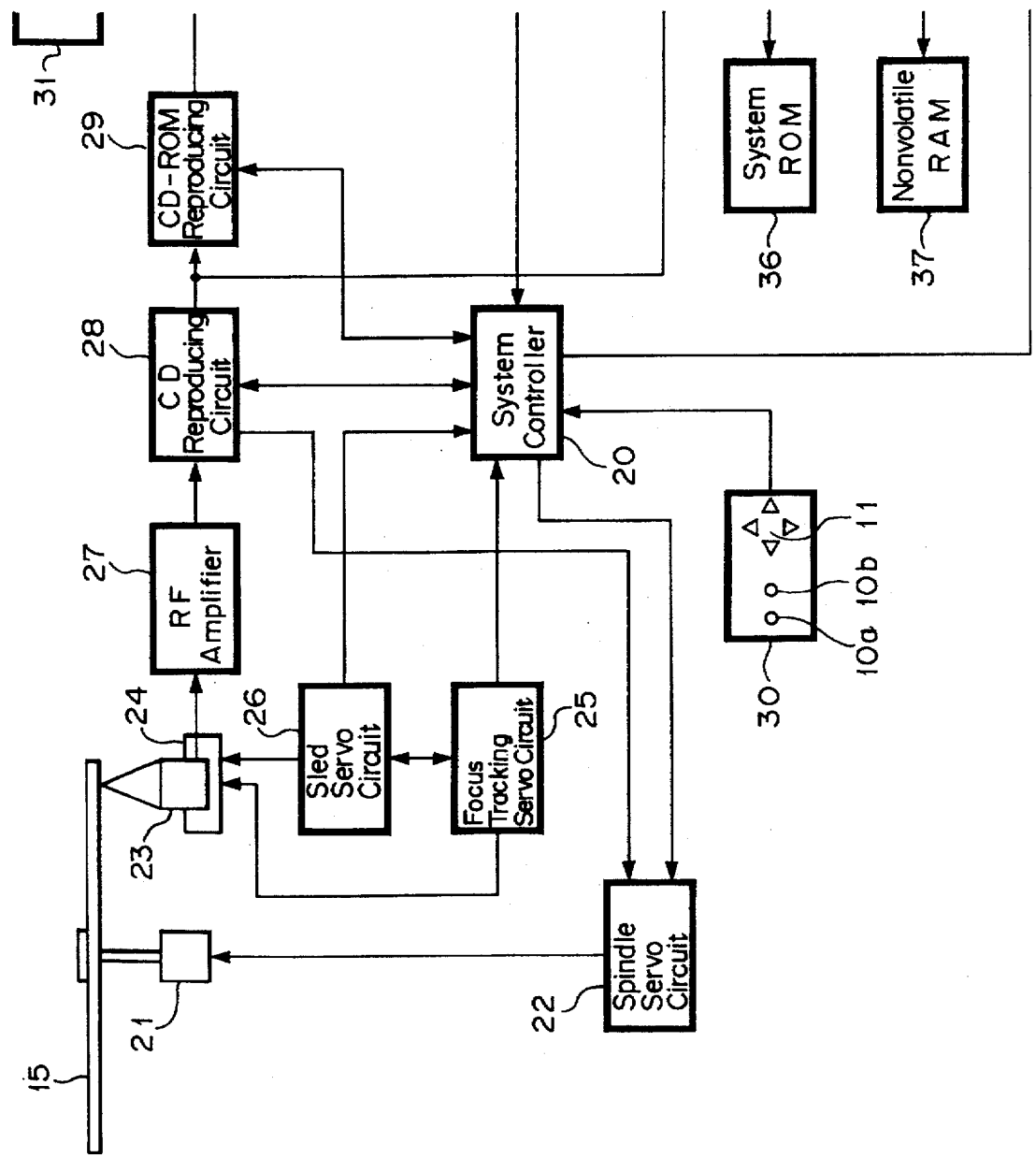
FIG. 5, which is formed of FIGS. 5A and 5B drawn on two sheets of drawings so as to permit the use of a suitably large scale, is a block diagram showing the inside of a disc reproducing apparatus according to the embodiment of the present invention.
Figure 5B:
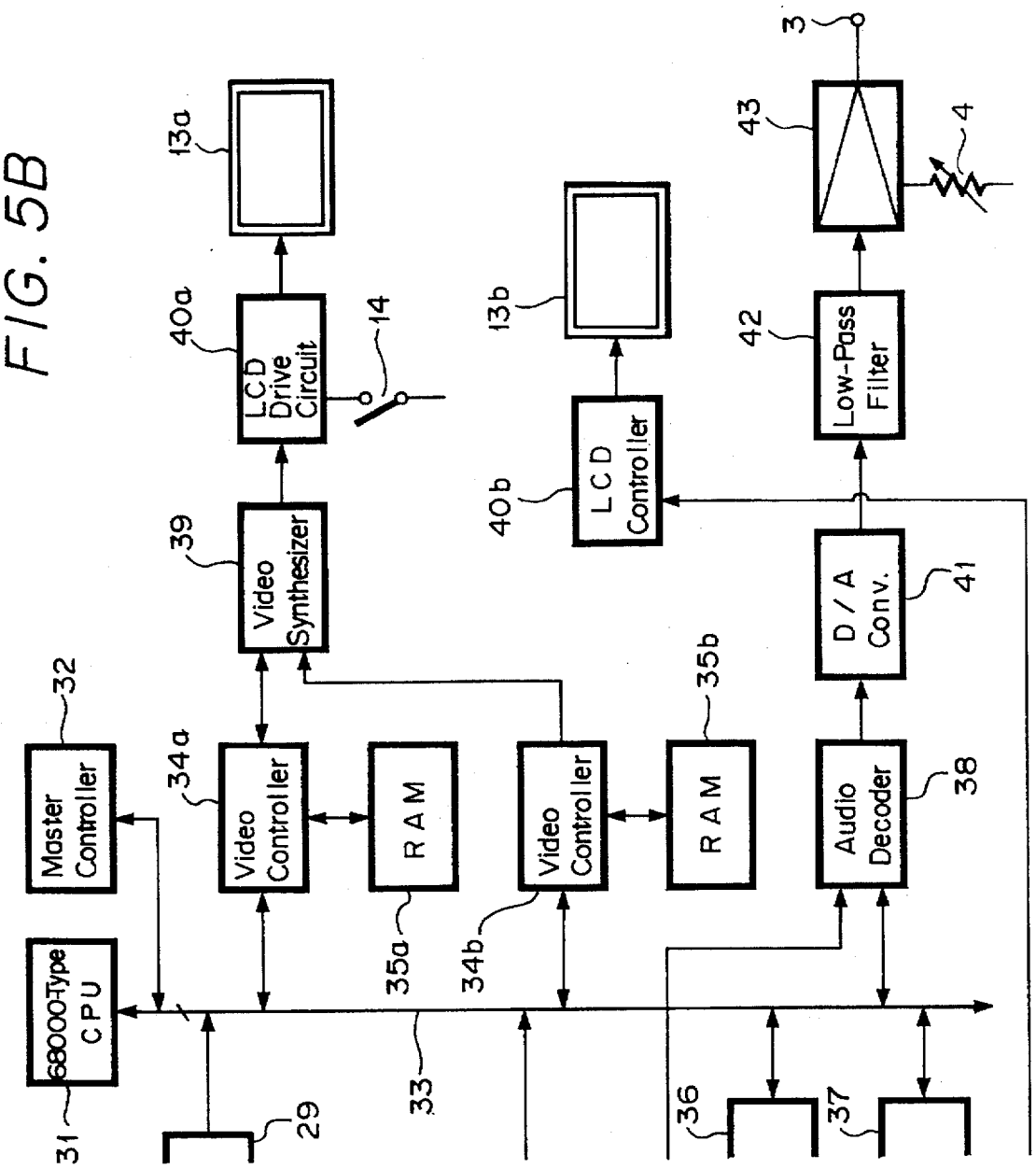

Referring to FIG. 5, the disc 15 is rotated by a spindle motor 21 in a CLV (constant linear velocity) fashion. The rotation of the spindle motor 21 is controlled by a spindle servo circuit 22 on the basis of a clock reproduced from a CD reproducing circuit 28. Also, the spindle servo circuit 22 is supplied with an output of a system controller 20.

A recorded signal on the disc 15 is reproduced by an optical pickup head 23 and the optical pickup head 23 is supported by a biaxial device (not shown). This biaxial device is supplied with an output of a focus tracking servo circuit 25. The focus tracking servo circuit 25 is supplied with an output of the system controller 20 and servo-controls the optical head 23 in the two axial directions, i.e., the focusing direction and the tracking direction on the basis of an output of a photo-detector (not shown).

The optical head 23 is made movable in the radial direction of the disc 18 by a slide feed mechanism 24 utilizing, for example, a linear motor. The slide feed mechanism 24 is controlled by a sled servo circuit 26 and the sled servo circuit 26 is supplied with the output of the system controller 20. This slide feed mechanism 24 enables the optical head 23 to access a desired track position.

The output of the optical head 23 is supplied through an RF amplifier 27 to the CD reproducing circuit 28. The CD reproducing circuit 28 is composed of a bit clock reproducing circuit or the like. The output of the optical head 23 is EFM (eight-to-fourteen modulation)-modulated and error-corrected by the CD reproducing circuit 28. The CD reproducing circuit 28 is controlled by the system controller 20.

An output of the CD reproducing circuit 28 is supplied to a CD-ROM reproducing circuit 29. The CD-ROM reproducing circuit 29 is formed of a sync. detecting circuit, a descramble circuit, an error-correcting circuit or the like. In the CD reproducing circuit 28, a sync. code is detected, scrambled data is descrambled, a header address is checked and a target block is accessed. Further, in the case of the form 1, an error correction is performed. The CD-ROM reproducing circuit 29 is controlled by the system controller 20.

The system controller 20 is supplied with an input from an input device 30, and the input device 30 is composed of two trigger buttons 10a, 10b and the X-Y pointing device 11.

A CPU 31 is adapted to control the entirety of the CD-I system and a b800 type CPU from Motorola could be utilized. The CPU 31 is coupled with a master controller 32 and the CPU 31 and the system controller 20 are coupled in a bidirectional fashion. A bus 33 is led out from the CPU 31. Incidentally, the CPU 31 and the master controller 32 might be fabricated as one-chip IC.

Data reproduced by the CD-ROM reproducing circuit 29 is sent to the bus 33 and the bus 33 is coupled with RAMs (random access memories) 35a and 35b via video controllers 34a and 34b. Also, the bus 33 is coupled with a system ROM 36 and a back-up nonvolatile RAM 37 in a bidirectional fashion. Further, the buss 33 is coupled with an audio decoder 38.

Of data reproduced by the CD-ROM reproducing circuit 29, image data is supplied to the video controllers 34a and 34b under the control of the CPU 31. The video controllers 34a and 34b derive video signals based on the image data. These video signals are supplied to a video synthesizer 39. The video signal from the video controller 34a and the video signal from the video controller 34b are synthesized by the video synthesizer 39. An output of the video synthesizer 39 is supplied through an LCD circuit 40a to an LCD display 13a. The driving of the LCD display 13a is turned on and off by the LCD drive switch (see FIG. 2) 14.

Of data reproduced by the CD-ROM reproducing circuit 29, audio data is supplied to the audio decoder 38 under the control of the CPU 31. If the audio data is the ADPCM data, then the ADPCM data is decoded by the audio decoder 38 and the audio data thus decoded is supplied to and converted to an analog signal by a D/A (digital-to-analog) converter 41. This analog audio signal is delivered from an output terminal 3 or headphone jack through a low-pass filter 42 and an amplifier 43. The level of an audio signal from the terminal 3 can be adjusted by the volume dial 4.

Operation in which the disc 15 is loaded on to the CD-I disc player 1 and then reproduced will be described below.

Figure 6A:
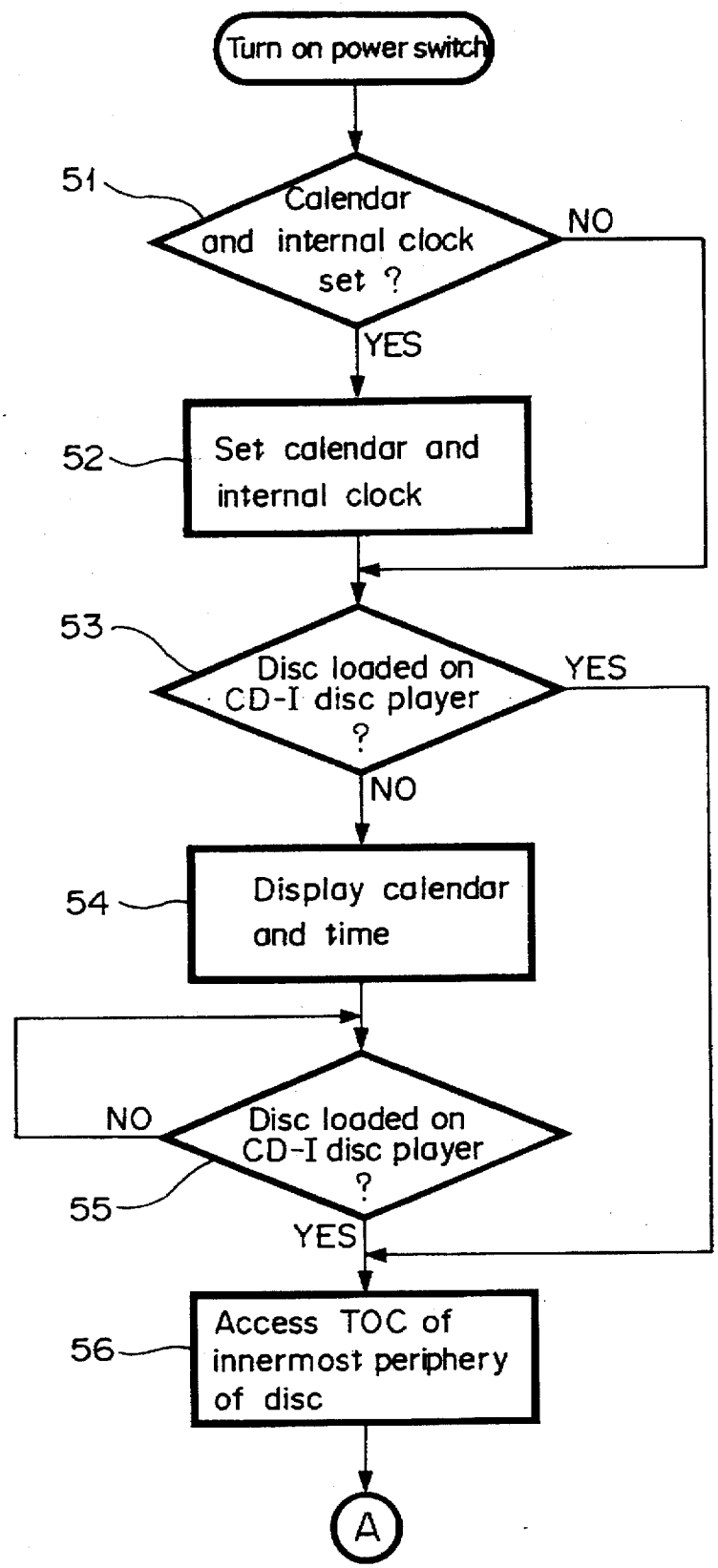
FIG. 6, which is formed of FIGS. 6A and 6B drawn on two sheets of drawings so as to permit the use of a suitably large scale, is a flowchart to which references will be made in explaining operation of the disc reproducing apparatus according to the embodiment of the present invention.
Figure 6B:
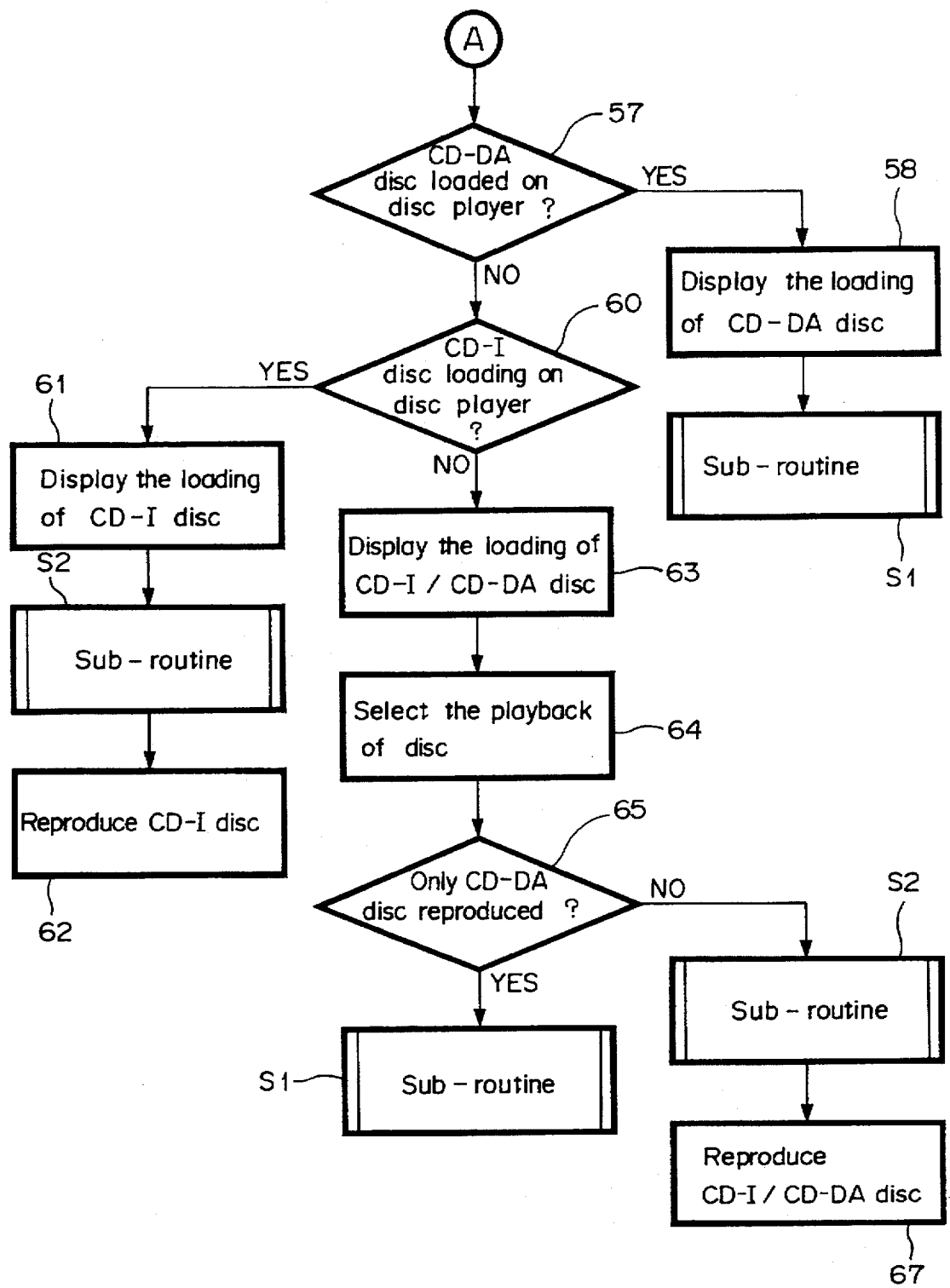

FIG. 6 shows a flowchart to which references will be made in explaining operation where the LCD display 13a is turned on.

Referring to FIG. 6, the power on/off switch 5 (see FIG. 1) is turned on and then it is determined in decision step 51 whether or not a calendar and an internal clock are set. If a YES is output at decision step 51, then the processing proceeds to the next step 52. If on the other hand a NO is output at decision step 51, then the processing proceeds to the next decision step 53.

In step 52, the X-Y pointing device 11 and the two trigger buttons 10a and 10b are operated to set the calendar and the internal clock and the processing proceeds to the next decision step 53.

Figure 7A:
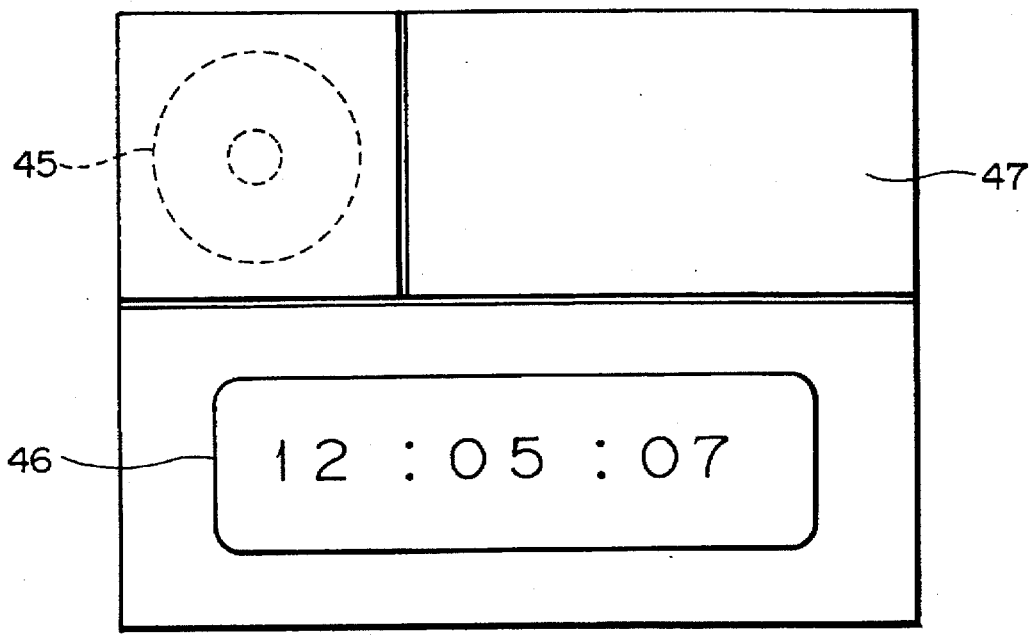
FIG. 7A is a schematic representation of a display screen of the disc reproducing apparatus according to the embodiment of the present invention upon playback and illustrating the condition such that a disc is not yet loaded on to the apparatus.

It is determined in decision step 53 whether or not the disc 15 is loaded on the CD-I disc player 1. If an answer is a YES at decision step 53, then the processing proceeds to step 56. If on the other hand the disc 15 is not yet loaded on to the CD-I disc player 1 as represented by a NO at decision step 53, then the processing proceeds to step 54, whereat a display indicating that the disc 15 is not yet loaded is displayed on a display area 45 of the LCD display 13a and also the calendar and time are displayed on a display area 46 as shown in FIG. 7A. Then, the processing proceeds to the next decision step 55.

In decision step 55, it is determined whether or not the disc 15 is loaded on to the CD-I disc player 1. If a YES is output at decision step 55, then the processing proceeds to step 56. In step 56, the TOC of the innermost periphery of the disc 15 is accessed and the processing proceeds to the next decision step 57.

It is determined in decision step 57 on the basis of the TOC data whether the disc 15 loaded is the CD-I/CD-DA disc, the CD-I disc or the CD-DA disc. That is, in the CD-I disc or the CD-I/CD-DA disc, when POINT=A0, PSEC is "10", while in other discs when POINT=A0, PSEC is "00". Therefore, from PSEC when POINT=A0, it can be determined whether the optical disc 15 is the CD-I disc, the CD-I/CD-DA disc or the CD-DA disc. If a YES is output at decision step 57, or if the disc 15 loaded is a CD-DA disc, then the processing proceeds to step 58.

Figure 7B:
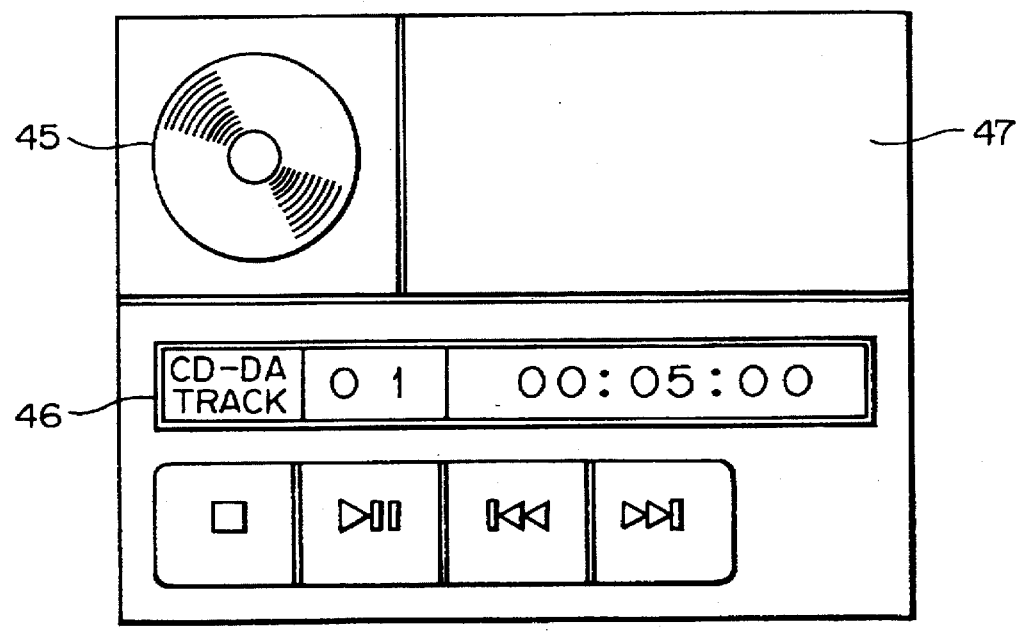
FIG. 7B is a schematic representation of the display screen of the disc reproducing apparatus according to the embodiment of the present invention upon playback and illustrating the condition such that the CD-DA disc is loaded on to the apparatus.

In step 58, a display indicating that the CD-DA disc is loaded on the CD-I disc player 1 is displayed on the LCD display 13a. More specifically, when the CD-DA disc is loaded on to the CD-I disc player 1, then the display indicating the disc loading is displayed on the display area 45 of the LCD display 13a and displays of operation keys such as PLAY, AMS, STOP or the like for operating the CD-DA disc are displayed on the display area 46, respectively as shown in FIG. 7B. Then, the processing proceeds to a sub-routine S1 which will be described later.

If the disc 15 is not the CD-DA disc as represented by a NO at decision step 57, the processing proceeds to the next decision step 60, whereat it is determined whether the disc 15 loaded is the CD-I disc or the CD-I/CD-DA disc. More specifically, the control field of the CD-I disc is (01X0) when POINT=A0, A1, A2, the control field of the CD-I/CD-DA disc is constantly (00x0) when POINT=A0 and the control field of other disc is (00X0). Accordingly, it can be determined on the basis of the control field whether the disc 15 loaded is the CD-I disc or the CD-I/CD-DA disc. Then, the processing proceeds to the next step 61.

Figure 7C:
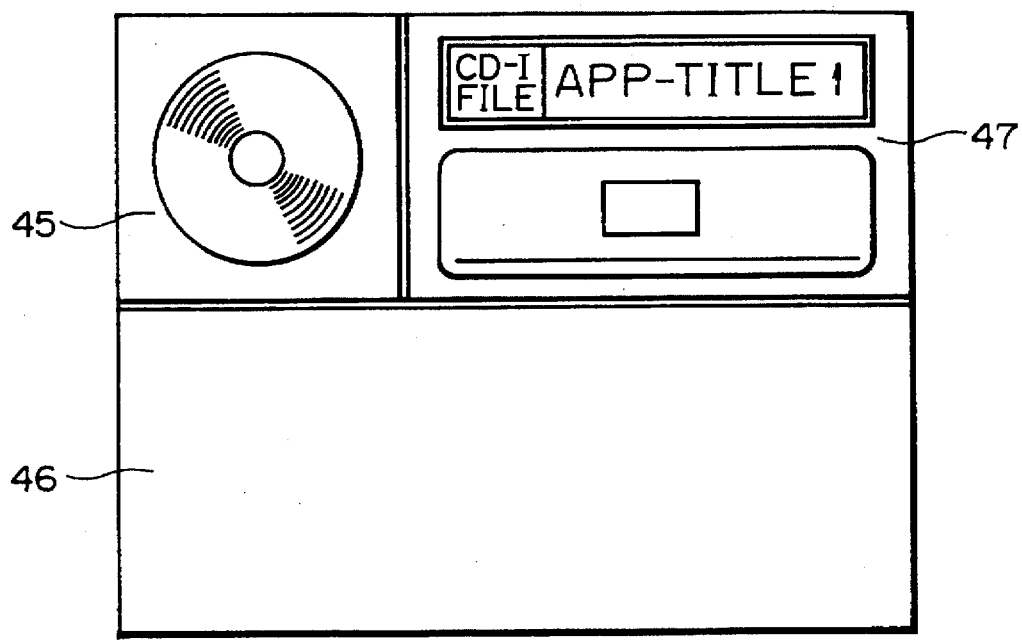
FIG. 7C is a schematic representation of the display screen of the disc reproducing apparatus according to the embodiment of the present invention upon playback and illustrating the condition such that the CD-I disc is loaded on to the apparatus.

In step 61, a display indicating that the CD-I disc is loaded on the CD-I disc player 1 is displayed on the LCD display 13a. That is, when the CD-I disc is loaded on to the CD-I disc player 1, then a display indicating the disc loading is displayed on the display area 45 of the LCD display 13a and a title of application software or the like is displayed on a display area 47 as shown in FIG. 7C. Then, the processing proceeds to the next sub-routine S2, whereat a predetermined processing is carried out and then the processing proceeds to the next step 62. The sub-routine S2 will be described later with reference to FIG. 9.

In step 62, if the user operates the CD-I disc player 1 by using the X-Y pointing device 11 and the trigger buttons 10a, 10b in accordance with the instruction on the application software, then then the CD-I disc can be reproduced accordingly.

Figure 7D:
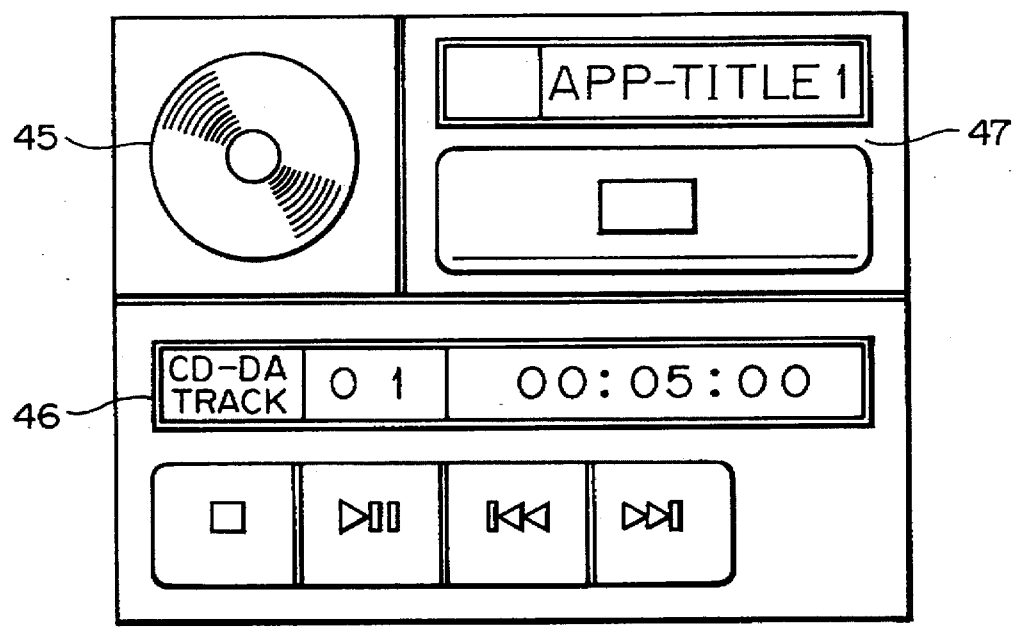
FIG. 7D is a schematic representation of the display screen of the disc reproducing apparatus according to the embodiment of the present invention upon playback and illustrating the condition such that the CD-I/CD-DA disc is loaded on to the reproducing apparatus.

If it is determined at decision step 60 that the disc 15 is not the CD-I disc, then it is determined that the disc 15 loaded is the CD-I/CD-DA disc. Then, the processing proceeds to the next step 63. In step 63, when the CD-I/CD-DA disc is loaded on to the CD-I disc player 1, the display of the disc loading is displayed on the display area 45 of the LCD display 13a, also displays of operation keys such as PLAY, AMS, STOP or the like for operating the CD-DA are displayed on the display area 46 and the title of the application software or the like is displayed on the display area 47 as shown in FIG. 7D. Then, the processing proceeds to step 64.

In step 64, the user operates the X-Y pointing device 11 and the trigger buttons 10a and 10b to select the playback of the disc. Then, the processing proceeds to the next decision step 65.

It is determined in decision step 65 whether or not the playback of the CD-DA is selected. If a YES is output at decision step 65, then the processing proceeds to the sub-routine S1 which will be described later. If on the other hand a NO is output at decision step 65, then the processing proceeds to the sub-routine S2, which will be mentioned later, in which a predetermined processing is carried out and the processing proceeds to step 67.

In step 67, if the user operates the CD-I player 1 by the X-Y device 11 and the trigger buttons 10a, 10b in accordance with the instruction of the application software, the CD-I/CD-DA is reproduced in response to this operation.

As described above, in the case of the CD-I/CD-DA disc, the playback of only the CD-DA area can be carried out, whereby only the audio portion of the application software is reproduced.

When the CD-DA disc is reproduced, then only the audio data is reproduced so that no data need be displayed on the LCD display 13a provided on the rear surface 12a of the outer lid 12. Further, when only the audio data is reproduced from the CD-I/CD-DA disc, the display on the LCD display 13a is not needed. If the LCD display 13a is driven when no data need be displayed on the LCD display 13a as described above, then power is consumed uselessly. To remove this disadvantage, in the CD-I disc player 1 of this embodiment, the LCD display 13a can be turned off by the LCD drive switch 14 if no data need be displayed thereon, thereby reducing the power consumption. In this case, the LCD controller 40b is controlled by the system controller 20 and a display information signal indicative of the music program number or the like is supplied to the LCD controller 40b, whereby the music information is displayed on the LCD display 13b.

However, if the LCD display 13a is turned off by the LCD drive switch 14, then the user cannot operate the CD-I disc player 1 while watching the informations displayed on the LCD display 13a. To solve this problem, it may be proposed to provide keys exclusively used for playing back the audio data in addition to the trigger buttons 10a, 10b and the X-Y pointing device 11. This proposal, however, increases the number of keys, which as a result causes the disc reproducing apparatus to become large in size. Therefore, according to this embodiment, when the disc loaded is the CD-DA disc and the LCD display 13a is turned off or when the disc loaded is the CD-DA disc for playing back the audio data and the LCD display 13a is turned off, the trigger buttons 10a, 10b and the X-Y pointing device 11 are designed to function as the keys exclusively used for playing back the audio data. More specifically, for example, the trigger button 10a functions as a "PLAY/PAUSE key", the trigger button 10b functions as a "STOP key" and the left and right parts of the X-Y pointing device 11 function as an "AMS key" so that, even when the LCD display 13a is turned off, then various audio reproducing operations can be carried out freely. Incidentally, no video data is reproduced from the CD-DA disc so that, when the CD-DA disc is loaded on the CD-I disc player 1, then the trigger buttons 10a, 10b and the X-Y pointing device 11 may function as the keys exclusively used for reproducing the audio data regardless of the on/off state of the LCD display 13a. Further, the trigger buttons 10a, 10b and the X-Y pointing device 11 may function as the keys exclusively used for reproducing the audio data so long as the LCD display 13a is turned off regardless of the type of the disc loaded. Furthermore, such a variant also may be possible that "PLAY/PAUSE", "STOP", "AMS" and so on may be displayed on the LCD display 13b and selected by the X-Y pointing device 11.

The above-mentioned sub-routine S1 will be described with reference to FIG. 8. In this embodiment, when audio data recorded on the disc 15 is reproduced, then image data is displayed on the LCD display 13a in accordance with the program recorded on the disc 15.

Figure 8:
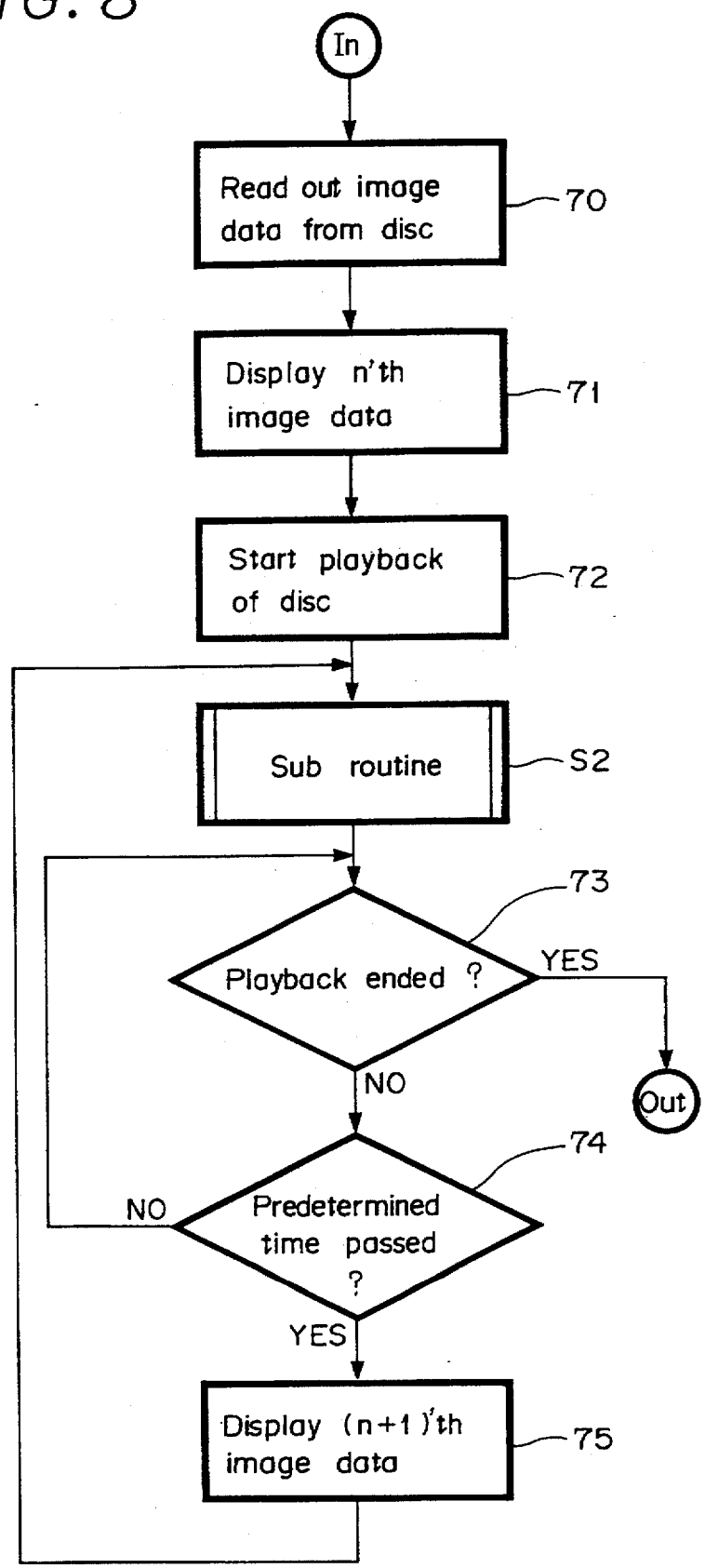
FIG. 8 is a flowchart to which references will be made in explaining operation of the disc reproducing apparatus according to the embodiment of the present invention upon playback.

In this sub-routine S1, referring to FIGS. 5 and 8, image data (e.g., words, pictures or the like) from the disc 15 is read out by the CPU 31 shown in FIG. 5 and the image data thus read out is written in the RAM 35a or 35b in step 70. Then, the processing proceeds to step 71.

In step 71, an n'th image data is displayed on the LCD display 13a and then the processing proceeds to step 72. When this CD-I player 1 is utilized as a so-called KARAOKE machine (machine for reproducing recorded musical accompaniment for amateur singers) and the disc 15 exclusively used for such musical accompaniment is reproduced, in step 71, the user selects the musical program number and song name by the trigger buttons 10a, 10b and the X-Y device 11, and the words of the selected song are displayed on the LCD display 13a.

In step 72, the playback of the disc 15 is started by the user by operating the trigger buttons 10a, 10b and the X-Y pointing device 11. During the playback, the processing proceeds to the sub-routine S2, which will be described later, data compression or the like is carried out. Then, the processing proceeds to the next decision step 73.

It is determined in decision step 73 whether or not the playback is ended. If a YES is output at decision step 73, then the processing proceeds through the sub-routine S1. If on the other hand a NO is output at decision step 73, then the processing proceeds to the next decision step 74. It is determined in decision step 74 whether or not a predetermined time after the start of reproduction is passed. If a YES is output at decision step 74, then the processing proceeds to the next step 75, while if a NO is output at decision step 74, then the processing returns to step 73 again. In that event, it may be determined on the basis of time data from the internal clock or time data or the like recorded beforehand in the disc 15 whether or not the predetermined time is passed.

In step 75, (n+1)'th image data is displayed on the LCD display 13a and the processing proceeds to sub-routine S2 again. When the above-mentioned KARAOKE disc 15, for example, is reproduced, then it may be proposed that words of the selected song are displayed on the LCD display 13a and are divided at many predetermined times. With this arrangement, the singer can sing a song well while watching the words displayed on the LCD display 13a.

As is apparent from the above, since the image data is displayed on the LCD display 13a in accordance with the program recorded on the disc 15 when the audio data recorded on the disc 15 is reproduced, image data such as pictures, words and so on are sequentially displayed on the LCD display 13a, which makes the disc reproducing apparatus of the present invention more useful.

The above-mentioned sub-routine S2 will be described with reference to a flowchart forming FIG. 9. This sub-routine S2 might be one such that is previously recorded on the disc 15 or in the system ROM 36 of the player unit 2. In this embodiment, when the image data such as pictures or the like from the disc 15 are displayed on the LCD display 13a, the display from the operation keys such as "STOP", "PLAY/PAUSE", "AMS" (auto music scan) or the like (i.e., display position of these operation keys on the display screen and methods) can be selected by the trigger buttons 10a, 10b and the X-Y pointing device 11. Also, when the image data such as pictures or the like are partly hidden and not fully displayed on the display screen of the LCD display 13a by other image data such as the control panel 46a (see FIGS. 10A and 10B), the image data can be reduced, for example, in size by using these trigger buttons 10a, 10b and the X-Y pointing device 11 so that the image data can be fully displayed on the display screen of the LCD display 13a.

Figure 9:
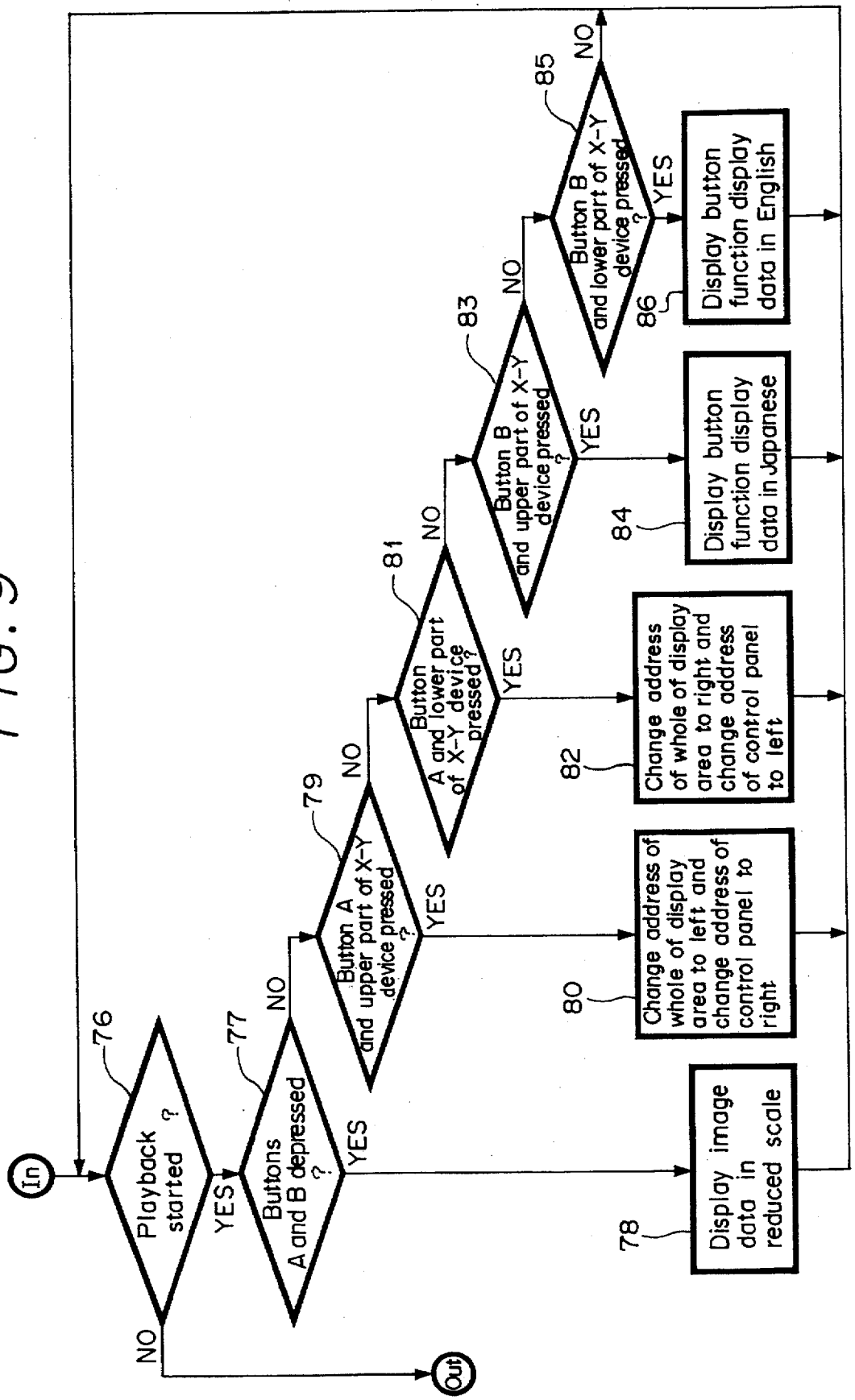
FIG. 9 is a flowchart to which references will be made in explaining operation of the disc reproducing apparatus according to the embodiment of the present invention upon playback.

More specifically, in this sub-routine S2, as shown in FIG. 9, it is determined in decision step 76 whether or not the playback of the CD-DA disc is started, i.e., whether or not the trigger buttons 10a, 10b and the X-Y pointing device 11 for playback and scanning of the CD-DA are depressed. If a YES is output at decision step 76, then the processing proceeds to the next decision step 77, while if a NO is output at decision step 76, then this sub-routine S2 is ended. For simplicity, the trigger buttons 10a, 10b will hereinafter be referred to as a button A (trigger button 10a) and a button B (trigger button 10b), respectively.

It is determined in decisions step 77 whether or not the button A (trigger button 10a) and the button B (trigger button 10b) are depressed simultaneously. If a YES is output at decision step 77, then the processing proceeds to step 78. If on the other hand a NO is output at decision step 77, then the processing proceeds to the next decision step 79. If a YES is output at decision step 77 (i.e., the processing proceeds to step 78), as shown in FIG. 10A, image data 46b such as picture or the like is partly hidden on the display screen of the LCD display 13a by the display of the control panel 46a for indicating operation keys necessary for reproducing the CD-DA, for example.

Figure 10A:
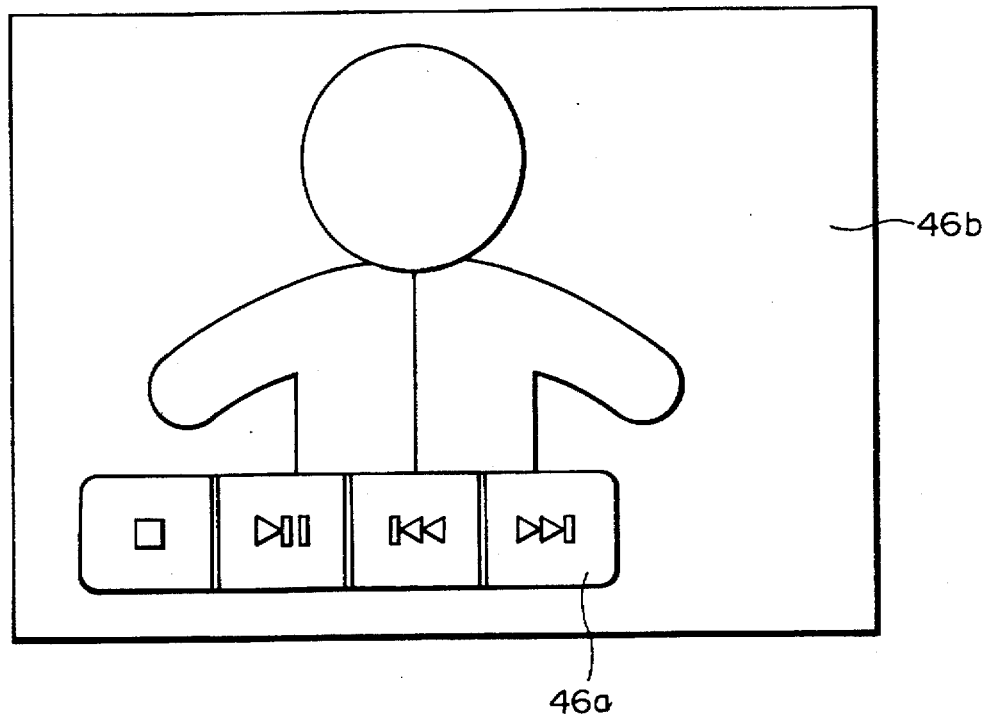
FIGS. 10A and 10B are respectively schematic representations illustrating specific examples of the display screen when the disc is played back according to the present invention.
Figure 10B:
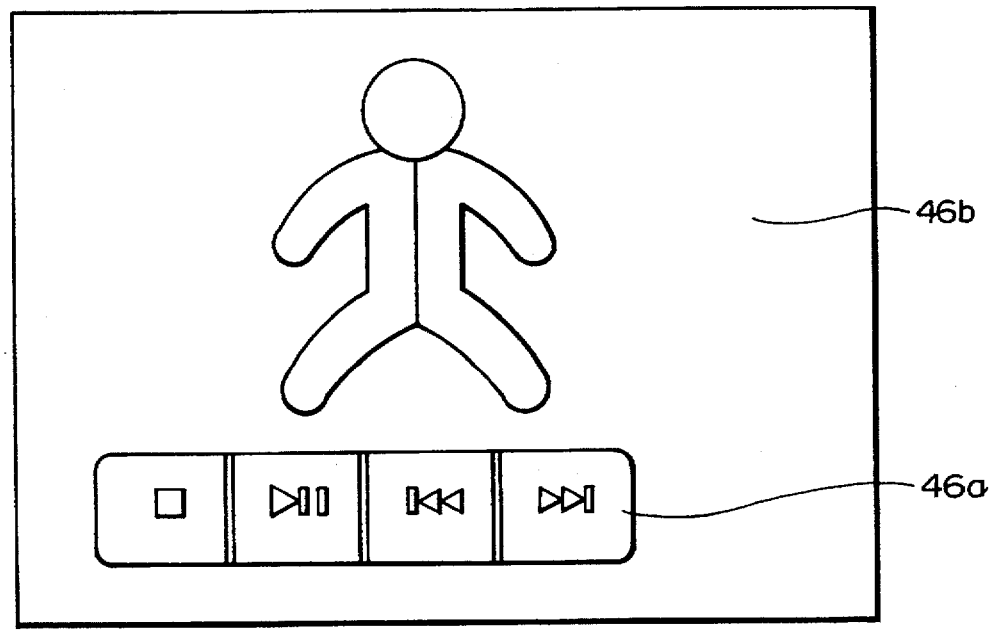

When the image data 46b such as picture or the like is partly hidden on the display screen of the LCD display 13a by the display of the control panel 46a for indicating operation keys necessary for reproducing the CD-DA, for example, as shown in FIG. 10A, in step 78, respective pixels of the image data 46b written, for example, in the RAM 35a or 35b (see FIG. 4) are selected and thrown away properly to be compressed and then written in the RAM 35a or 35b together with the image data on the control panel 46b. Then, the image data 46b written and the control panel 46a are read out and thereafter, they are processed by the video synthesizer 39a and the LCD driver circuit 40a and thereby displayed on the display screen of the LCD display 13a. At that time, as shown in FIG. 10B, the reduced image data 46b is displayed on the display screen of the LCD display 13a and the control panel 46a indicating the operation keys also are displayed thereon. Then, the sub-routine S2 is ended.

It is determined in the next decision step 79 whether or not the button A (trigger button 10a) and the upper part of the X-Y device 11 are depressed. If a YES is output at decision step 79, then the processing proceeds to step 80, while if a NO is output at decision step 79, then the processing proceeds to the next decision step 81.

Figure 11A:
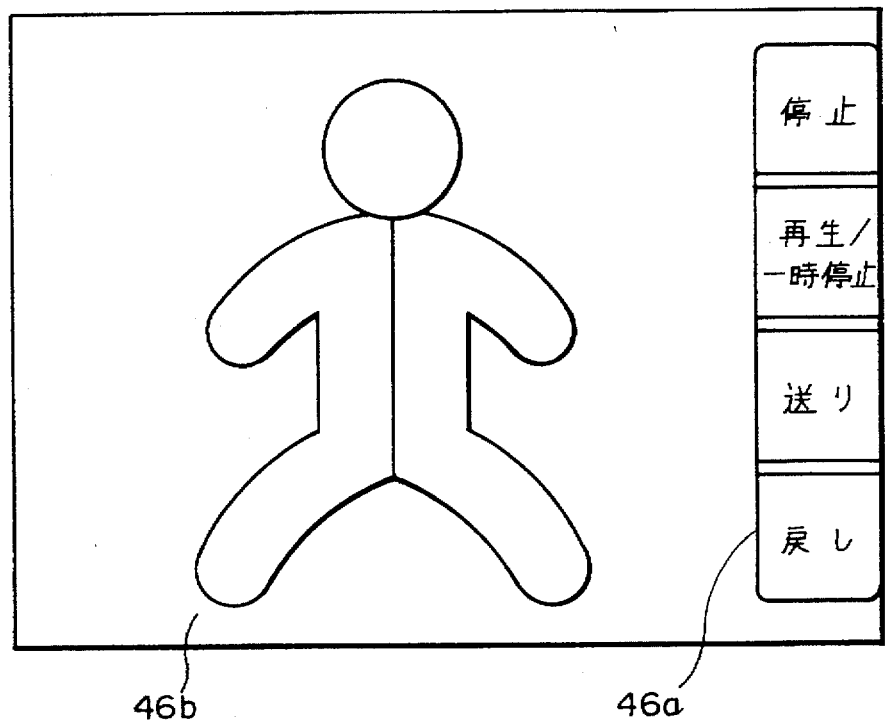
FIGS. 11A and 11B are respectively schematic representations illustrating specific examples of the display screen when the CD-I/CD-DA disc is loaded.

In step 80, as shown in FIG. 11A, the address of the whole image data 46b is changed so as to be displayed on the left on the display screen of the LCD display 13a, the control panel 46a is arrayed in the longitudinal direction and the address of the control panel 46a is changed so as to be displayed on the right on the display screen of the LCD display 13a. In this case, let it be assumed that the image data 46b was already reduced in size at that very moment. Further, the display form of the respective operation keys on the control panel 46a in FIG. 11A will be described later.

It is determined in decision step 81 whether or not the button A (trigger button 10a) and the lower part of the X-Y device 11 are depressed. If a YES is output at decision step 81, then the processing proceeds to decision step 82, while if a NO is output at decision step 81, then the processing proceeds to the next decision step 83.

Figure 11B:
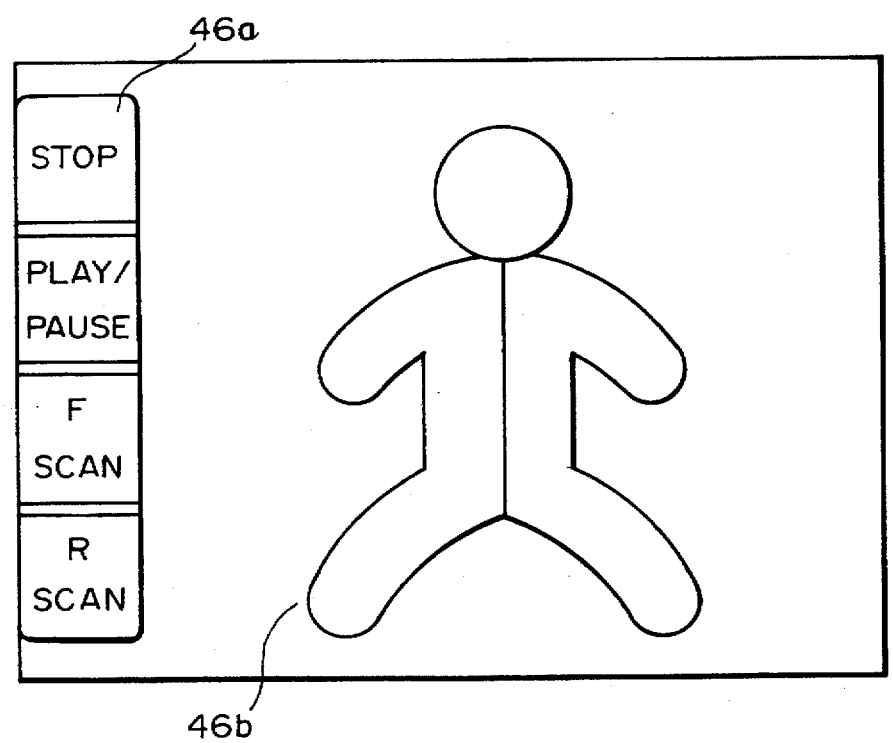

In step 82, as shown in FIG. 11B, the address of the whole image data 46b is changed so as to be displayed on the right of the display screen of the LCD display 13a, the control panel 46a is arrayed in the longitudinal direction and the address of the control panel 46a is changed so as to be displayed on the left of the display screen of the LCD display 13a. Also, in this case, let it be assumed that the image data was already reduced in size. Further, the display form of the respective operation keys on the control panel 46a in FIG. 11B will be described later.

It is determined in decision step 83 whether or not the button B (trigger button 10b) and the upper part of the X-Y device 11 are depressed. If a YES is output at decision step 83, then the processing proceeds to the next step 84, while if a NO is output at decision step 83, then the processing proceeds to the next decision step 85.

In step 84, as shown in FIG. 11A, functions of the respective operation keys on the control panel 46a are displayed in the style of [停止], [再生/一時止], [送り] and [戻し] in the Japanese language. Image data of [停止], [再生/一時止], [送り] and [戻し] are recorded in the disc 15 in advance.

It is determined in decisions step 85 whether or not the button B (trigger button 10b) and the lower part of the X-Y device 11 are depressed. If a YES is output at decision step 85, then the processing proceeds to step 86, while if a NO is output at decision step 85, then the processing returns to decision step 76.

In step 86, as shown in FIG. 11B, the functions of the respective operation keys of the control panel 46a are displayed in the form of [STOP], [PLAY/PAUSE], [F SCAN] and [R SCAN] by both the English language and English abbreviations. Incidentally, image data of these [STOP], [PLAY/PAUSE], [F SCAN] and [R SCAN] are recorded beforehand in the disc 15.

As described above, according to this embodiment, if the button A (trigger button 10a) and the button B (trigger button 10b) are depressed, the image data 46b is reduced in size and displayed on the display screen of the LCD display 13a.

If the button A (trigger button 10a) and the upper part of the X-Y pointing device 11 are depressed, the image data 46b is displayed on the left side of the display screen of the LCD display 13a, the control panel 46a is arrayed in the longitudinal direction and this control panel 46a is also displayed on the right of the display screen of the LCD display 13a.

If the button A (trigger button 10a) and the lower part of the X-Y pointing device 11 are depressed, then the image data 46b is displayed on the right side of the display screen of the LCD display 13a, the control panel 46a is arrayed in the longitudinal direction and this control panel 46a is also displayed on the left side of the display screen of the LCD display 13a. reduced in size and displayed on the display screen of the LCD If the button B (trigger button 10b) and the upper part of the X-Y pointing device 11 are depressed, the displays indicative of the functions of the respective operation keys of the control panel 46a displayed on the display screen of the LCD display 13a are displayed in Japanese.

If the button B (trigger button 10b) and the lower part of the X-Y pointing device 11 are depressed, the displays indicative of the functions of the respective operation keys of the control panel 46a displayed on the display screen of the LCD display 13a are displayed in English.

If any of the above buttons is not depressed, then the image data 46b is not modified and displayed on the display screen of the LCD display 13a and the displays indicative of the functions of the respective operation keys of the control panel 46a are displayed in the form of signs as shown in FIGS. 7B and 7D.

Accordingly, if the button A (trigger button 10a) and the upper part of the X-Y pointing device 11 are depressed and the button B (trigger button 10b) and the upper part of the X-Y pointing device 11 are depressed, then the displayed state becomes as shown in FIG. 11A. If the button A (trigger button 10a) and the lower part of the X-Y device 11 are depressed and the button B (trigger button 10b) and the lower part of the X-Y pointing device 11 are depressed, then the displayed state becomes as shown in FIG. 11B.

Incidentally, the combination, order or the like of the depression of the trigger buttons 10a, 10b and the X-Y pointing device 11 for determining the displayed state or the like on the display screen of the LCD display 13a are not limited thereto and can be freely selected.

As described above, according to this embodiment, the user can make the selection such that the image data 46b provided as the software on the disc 15 is reduced in size and displayed on the LCD display 13a, the control panel 46a is displayed in the longitudinal or lateral direction on the LCD display 13a or that the functions of the respective keys of the control panel 46a are displayed by signs or in Japanese or English. Thus, even when the image data 46b is hidden bythe control panel 46a on the display screen of the LCD display 13a, the image data 46b can be displayed fully by the user's selection or the user can select the displayed form of the functions of the respective operation keys of the control panel 46a displayed.

According to the disc and disc reproducing apparatus of the present invention, when the disc on which at least audio data such as sound, music or the like and image data such as the pictures, characters or the like are recorded is reproduced, the image data is read out upon reproducing the audio data, the image data read-out is selected and sequentially displayed on the display means which displays the image data so that the image data such as pictures, words and the like, for example, is sequentially displayed together with the audio data such as music or the like, which can make this reproducing apparatus more useful in use.

Further, according to the disc and disc reproducing apparatus of the present invention, the operation image data (control panel) indicating the operation keys such as STOP, PLAY/PAUSE, AMS (auto music scan) or the like are displayed on the display means in order to select the audio data or to operate the reproduction of the audio data and the operation image data are displayed on the display means together with the image data. Further, the image data is compressed and then displayed on the display means when the operation image data are displayed on the display means together with the image data. Therefore, the image data sequentially displayed upon playback of the audio data can be displayed together with the image data indicating the operation keys without being deteriorated from a visual standpoint. Furthermore, since the contents of the operation functions of the respective operation keys are displayed at least in the two display forms, the user can handle this disc reproducing apparatus more efficiently.

Having described the preferred embodiment of the invention with reference to the accompanying drawings, it is to be understood that the invention is not limited to that precise embodiment and that various changes and modifications thereof could be effected by one skilled in the art without departing from the spirit or scope of the invention as defined in the appended claims.

What is claimed is:

1. A disc reproducing apparatus for reproducing a disc on which at least audio data, for playing back as sound, and image data, corresponding to visual displays, are recorded, the disc reproducing apparatus comprising:

reproducing means for reproducing audio data recorded on the disc;

memory means for storing image data received from the disc;

video signal generating means for generating a video signal on the basis of the image data stored in the memory means;

display means supplied with the video signal and for displaying a display based on the video signal which corresponds to the image data; and image processing means for storing the image data in the memory means when the audio data is reproduced and selecting the stored image data so that displays corresponding to selected image data are sequentially displayed on the display means, such that the displays are changed in sequence based upon the passage of predetermined amounts of time measured from the start of reproduction of the audio data.

2. A disc reproducing apparatus according to claim 1, wherein displays corresponding to the image data are displayed on the display means in the same order as that of reproducing the audio data.

3. A disc reproducing apparatus according to claim 1, further comprising means for storing in the memory means operation image data which corresponds to the display of a control panel having a plurality of operation keys used to select the audio data or to reproduce the audio data, means for reading out the stored operation image data together with the image data and displaying he control panel on the display means together with the image data.

4. A disc reproducing apparatus according to claim 3, further comprising means for displaying the control panel in at least in two different forms and for selecting the form of the control panel for display.

5. A disc reproducing apparatus according to claim 4, wherein the displayed form of the control panel is selected by an X-Y pointing device and a plurality of trigger switches.

6. A disc reproducing apparatus according to claim 3, further comprising means for compressing the image data by selecting and throwing away pixels of the image data and means for displaying the compressed image data on a display screen of the display means together with the control panel.

7. A disc reproducing apparatus according to claim 3, further comprising means for selecting a position at which the control panel is displayed on a display screen of the display means.

8. A disc reproducing apparatus according to claim 7, wherein the position of the control panel on the display screen of the display means is selected by an X-Y pointing device and a plurality of trigger switches.

9. A disc reproducing apparatus according to claim 1, further comprising second reproducing means for reproducing the image data from the disc, wherein the reproducing means for reproducing audio data and the second reproducing means for reproducing image data can reproduce data from a disc.

* * * * *